Aug. 15, 1933.　　　J. C. ALBRIGHT　　　1,922,834
PRESSURE MEASURING DEVICE
Filed Nov. 26, 1930
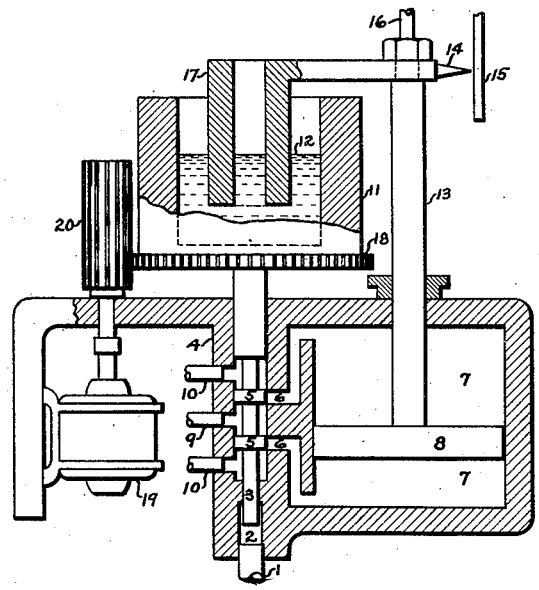
INVENTOR
Joseph C. Albright,
BY
ATTORNEY Patented Aug. 15, 1933

1,922,834

UNITED STATES PATENT OFFICE 1,922,834

PRESSURE MEASURING DEVICE

Joseph C. Albright, Cleveland Heights, Ohio, assignor to Bailey Meter Company, a Corporation of Delaware Application November 26, 1930
Serial No. 498,374

11 Claims. (Cl. 73—111)

This invention relates in general to devices wherein the positioning of a member by a relatively weaker control force results in the positioning of another member by an amplified or relatively greater force to accomplish a useful purpose. Such devices are known as torque or power amplifiers, and may position the second member directly in step with the first member, or the movement of the second member may bear a functional relation to the movement of the first member or in relation to the amount and direction of departure of the first member from a given position; but in any event the second member is caused to move or to be positioned as a result of a change in position of the first member, and with a force relatively greater than the force imparted to the first member.

The first member may be positioned or caused to depart from a given position through various causes; for example, by variations in pressure, differential pressure, temperature, rate of fluid flow, or in fact any variable factor or relation whose force is desirably magnified to position a second member requiring a relatively greater force for such positioning. The second member so positioned may move an indicator or can be used to move a damper or valve or desirable regulable mechanism whose movement may or may not result in a change in value of the factor which caused the initial movement of the first member.

My invention resides in certain improvements and arrangement of parts in such devices wherein many advantages are obtained.

One object is to provide such a torque or power amplifier utilizing hydraulic power.

Another object is to arrange the hydraulic power producing and controlling parts in a single unit.

A further object is to provide means wherein the movement of the secondary member may bear a desirable relation to the movement of the primary member.

Still another object is to provide variable counterbalancing means of the first member through cooperative effect of the movement of both members.

A still further object is to have the movement of the second member result in shutting off of the amplified power effective in causing such a movement.

With these and further objects in view I will now describe certain preferred embodiments of my invention.

On the drawing is an elevation, partly in section, of an amplified power device having variable counterbalancing means of the control force.

Referring to the figure, I have illustrated an arrangement wherein a pressure which is greater than that of the atmosphere is applied through a pipe 1 to a cylinder 2 and effective upon a piston 3 for axial positioning of same. The piston 3, external of the cylinder 2 and in another chamber of the general casing 4, forms a pilot having lands 5 cooperating with ports designated at 6, to control the passage of hydraulic fluid to the power cylinder 7 at one side or the other of the power piston 8. Hydraulic fluid from a source (not shown) enters the pilot casing 4 through the pipe 9 and drains through the pipes 10.

An extension of the piston 3 forms a member 11 having a chamber wherein is a liquid 12, in the preferred form being mercury, the member 11 being positioned, as is the pilot, with the piston 3 upon an application of pressure to the cylinder 2.

Hydraulic fluid effective in the cylinder 7 upon the piston 8, results in a positioning of the piston 8 and correspondingly of a piston rod 13 having a pointer 14 cooperating with an index 15, and an extension 16 which may accomplish further indication or useful work with a force amplified relative to that effective in initially positioning the piston 3.

An important feature of my invention lies in the provision of variable counterbalancing means of the pressure, wherein a displacing member 17 rigidly fixed to the piston rod 13 and moving with it, is adapted to depend into the mercury 12 to the end that the buoyant effect of said displacer submerged in varying amounts in the mercury effects a variable counterweighting of the pressure.

The upward force of the pressure to be measured applied through the pipe 1 to the piston 3 is counterbalanced by two downwardly acting force components, the one a constant amount comprising the dead weight of the assembly or parts 3, 5, 11 and 12, and the other the reaction effect of the variable buoyant force exerted by the displacer 17 upon the mercury 12. This buoyant effect, varying with the amount of submersion of the displacer, is of course zero when the displacer just touches the mercury, gradually increasing to a maximum as submersion reaches a predetermined amount.

With atmospheric pressure effective through the pipe 1 upon the piston 3, the assembly of piston 3 and member 11 will rest at their lowermost travel position due to gravity, while the power piston 8 and the parts carried thereby will be in their uppermost travel position wherein the bottom of the displacer 17 is just touching the surface of the mercury 12, and no displacing or buoyant counterbalancing effect is present, the pointer 14 being opposite the minimum graduation of the index 15.

Assuming an increase in pressure applied through the pipe 1 over atmospheric, the piston 3 tends to move upward against the fixed weight downwardly acting force component and having overcome same, rises to a position such that the mercury begins to encounter the displacer. In moving away from a position wherein the lands 5 of the pilot close passage to the ports 6, fluid is admitted to the cylinder 7, and if as in the example, pressure at the pipe 1 has increased, causing an upward motion or positioning of the piston 3, then hydraulic fluid available at the pipe 9 will be admitted through the port 6 to the upper side of the piston 8 and simultaneously fluid will be drained through the lower port 6 from the lower side of the piston 8, resulting in a downward positioning of the piston 8 and the parts carried thereby.

As the piston moves downward, the displacer 17 encounters the mercury 12, becoming an added weight and effecting a variable counterbalancing force to the end that not only is the pressure at the pipe 1 effectively counterbalanced, but the piston is positioned to its original position wherein the lands 5 shut off passage of hydraulic fluid through the ports 6 and further movement of the piston 8 ceases.

I have found that for the sake of accuracy it is desirable to minimize resistance to axial positioning of the piston 3, and to that end I preferably rotate the piston and the parts carried by it. As shown in the figure attached to the lower part of the member 11 is a gearwheel 18 rotated by a motor 19 through a pinion 20 in a manner such that axial positioning of the gearwheel 18 and the parts to which it is attached may take place during rotation.

It will be seen that I have illustrated an arrangement of parts wherein the pressure responsive piston 3, upon a change in applied pressure, positions a pilot to control an amplified force resulting not only in a variable counterbalancing of the applied pressure and in the returning of the pilot to its predetermined position, but also in the positioning of a member or a part indicating the applied pressure in desirable relation of motion thereto, or providing a positioning with greater power to accomplish useful work. The arrangement might equally well have the displacer carried and positioned by the piston 3 and the fluid means positioned by the power piston 8, so long as they each move and may be positioned relative to each other and so long as one of the two members is positioned with the pilot, and the cooperation of the two results in the returning of the pilot to its initial or predetermined position, shutting off passage of hydraulic fluid to the amplified power parts.

I have provided an amplified power positioning device wherein a relatively weaker control force positions a member to result in the positioning of a second member with greater force, thereby indicating the position or movement of the first member as an indication of the position or variation in position or amount of a factor whose variation results in the relatively weaker control force; or the motion of the second member having relatively greater power may accomplish useful work such as controlling the factor, or some other factor.

I may provide other forms of fluid operating or fluid actuating means, or other ways of rotating or keeping free for axial positioning the pilot.

Having thus illustrated and described a preferred embodiment of my invention, I desire it to be understood that I am not to be limited thereby except as claimed in view of prior art.

What I claim as new and desire to secure by Letters Patent of the United States, is:—

1. In a pressure measuring device, means adapted to be positioned by the pressure to be measured, and variable counterbalancing means for said first-named means comprising two movable members, one of said members having a chamber, a liquid in the chamber, the other of said members comprising a displacer adapted to depend into said liquid, whereby the buoyant effect of said displacer submerged a variable amount in said liquid effects a varying counterbalancing of the pressure.

2. In a pressure measuring device, means adapted to be positioned by the pressure to be measured, and variable counterbalancing means for said first-named means comprising two movable members, one of said members having a chamber, a liquid in the chamber, the other of said members comprising a displacer adapted to depend into said liquid, whereby the buoyant effect of said displacer submerged a variable amount in said liquid effects a varying counterbalancing of the pressure, one of said members positioned with said first-named means.

3. In a pressure measuring device, means movable in response to variations in the pressure to be measured, variable counterbalancing means for said means comprising two movable members, one of said members having a chamber, a liquid in the chamber, the other of said members comprising a displacer adapted to depend into said liquid, whereby the buoyant effect of said displacer submerged a variable amount in said liquid effects a varying counterbalancing of the pressure, one of said members movable with said first-named means, and means responsive to a departure of said first-named means from a predetermined position for positioning the other of said members to effect a return of said first-named means to the predetermined position.

4. In a pressure measuring device, means movable in response to variations in the pressure to be measured, variable counterbalancing means for said first-named means comprising two movable members, one of said members having a chamber, a liquid in the chamber, the other of said members comprising a displacer adapted to depend into said liquid, whereby the buoyant effect of said displacer submerged a variable amount in said liquid effects a varying counterbalancing of the pressure; fluid means controlled by said first-named means, one of said members movable with said first-named means, the other of said members movable by said fluid means.

5. In a pressure measuring device, means movable in response to variations in the pressure to be measured, variable counterbalancing means for said first-named means comprising two movable members, one of said members having a chamber, a liquid in the chamber, the other of said members comprising a displacer adapted to depend into said liquid, whereby the buoyant effect of said displacer submerged a variable amount in said liquid effects a varying counterbalancing of the pressure; fluid actuated means, means controlling admission of the fluid to said fluid actuated means, said last-named means movable by said first-named means, one of said members movable with said first-named means, the other of said members movable by said fluid actuated means.

6. In a pressure measuring device, movable means responsive to variations of the pressure to be measured, a member moved in synchronism with said movable means, means controlled by departure of said movable means from a predetermined position for effecting a return of said movable means to said predetermined position, said last-named means comprising a second member, said second member movable relative to said first-named member and assuming a position for every pressure, said members cooperating to form a variable counterbalancing means of the pressure.

7. In a pressure measuring device, means movable in response to variations in the pressure to be measured, said means comprising a pilot; a pilot casing, a source of hydraulic fluid, said hydraulic fluid available at said pilot casing, a cylinder, a piston cooperating therein, said pilot arranged to control the passage of said hydraulic fluid to said cylinder, variable counterbalancing means for said first-named means comprising two movable members, one of said members having a chamber, a liquid in the chamber, the other of said members comprising a displacer adapted to depend into said liquid, whereby the buoyant effect of said displacer submerged a variable amount in said liquid effects a varying counterbalancing of the pressure, one of said members movable with said first-named means, the other of said members movable with said piston.

8. In combination, a cylinder having a pressure connection thereto, a piston adapted for axial movement in said cylinder responsive to pressure variations in the cylinder, a pilot valve for controlling the passage of hydraulic fluid comprising a pilot and a pilot casing, said pilot movable with said piston, fluid actuated means controlled by said pilot valve, said fluid actuated means causing a return of said pilot to a predetermined position following a departure therefrom.

9. The combination with a member movable in response to a force which varies with the magnitude of a variable to be measured, of means for exerting on said movable member an opposing force comprising a member movable relative to said first-named member, one of the members provided with a displaceable liquid, the other of the members provided with means to displace the liquid, and a source of power, said second-named member movable by said source of power under the control of the first-named member.

10. The combination with a member movable from a predetermined position in response to variations in a force which varies with the magnitude of a variable to be measured, of means for exerting on said member an opposing force to return it to the predetermined position comprising a second member movable relative to the first-named member, one of said members provided with a displaceable liquid, the other of said members provided with means to displace said liquid, and a source of power, said second-named member movable by the source of power under the control of the first-named member.

11. In combination, a pilot valve comprising a vertical movable valve member and a valve casing therefor, inlet and outlet ports in said casing, said valve member controlling the flow of hydraulic fluid from said inlet ports to said outlet ports, one end of the valve member extending into a cylinder and forming a piston, the other end of the valve member connected to a casing containing a liquid, a cylinder, a piston therein, the outlet ports of the pilot valve entering said cylinder at either side of said piston, and a piston rod connected to the piston and provided with a displacing member depending into the liquid, and indicating means of the position of said piston.

JOSEPH C. ALBRIGHT.